(12) United States Patent
Croci

(10) Patent No.: US 6,541,884 B1
(45) Date of Patent: Apr. 1, 2003

(54) PUMP UNIT PARTICULARLY FOR MEDICAL AND FOOD USE

(76) Inventor: Gabriele Croci, Viale Dei Mille, 4—I-42015 Correggio (Reggio Emilia) (IT)

( * ) Notice: Subject to any disclaimer, the term of this patent is extended or adjusted under 35 U.S.C. 154(b) by 0 days.

(21) Appl. No.: 09/618,450

(22) Filed: Jul. 18, 2000

(51) Int. Cl.[7] .................. H02K 5/132; H02K 5/128; F04D 13/08
(52) U.S. Cl. .................. 310/87; 310/86; 310/156.01; 310/68 B; 417/410.1; 417/423.3; 417/423.7
(58) Field of Search .................. 310/86, 87, 68 B, 310/156; 417/410.1, 423.1, 423.3, 423.7, 424.1

(56) References Cited

U.S. PATENT DOCUMENTS

| | | | | |
|---|---|---|---|---|
| 2,322,924 A | * | 6/1943 | Daiger | 310/86 |
| 2,649,049 A | * | 8/1953 | Pezzillo et al. | 310/86 |
| 2,673,301 A | * | 3/1954 | Richter | 310/86 |
| 3,572,982 A | * | 3/1971 | Kozdon | 417/423.7 |
| 4,726,738 A | * | 2/1988 | Nakamura et al. | 417/22 |
| 4,955,790 A | * | 9/1990 | Nakanishi et al. | 310/68 C |
| 5,039,286 A | * | 8/1991 | Point et al. | 417/424.1 |
| 5,197,865 A | | 3/1993 | Sevrain et al. | 417/420 |
| 5,219,276 A | * | 6/1993 | Metzner et al. | 417/356 |
| 5,376,866 A | * | 12/1994 | Erdman | 318/254 |
| 5,915,931 A | * | 6/1999 | Lindner et al. | 417/420 |
| 6,183,412 B1 | * | 2/2001 | Benkowski et al. | 600/16 |
| 6,293,773 B1 | * | 9/2001 | Doberstein et al. | 417/420 |

OTHER PUBLICATIONS

Hendershot et al., "Design of Brushless Permanent Magnet Motors," 1994, Magna Physics Publishing, p. 3–1.*

* cited by examiner

Primary Examiner—Burton S. Mullins
(74) Attorney, Agent, or Firm—Birch, Stewart, Kolasch & Birch, LLP

(57) ABSTRACT

A pump unit for medical and food use, including: a stator provided with a number n of poles and powered by a power and control circuit fed by alternating electric current; a rotor having an equal number n of poles, which is fixed directly onto a shaft of a pump; and a jacket of amagnetic material which isolates the rotor from the outside and is positioned within the air gap between the rotor and the stator.

9 Claims, 4 Drawing Sheets

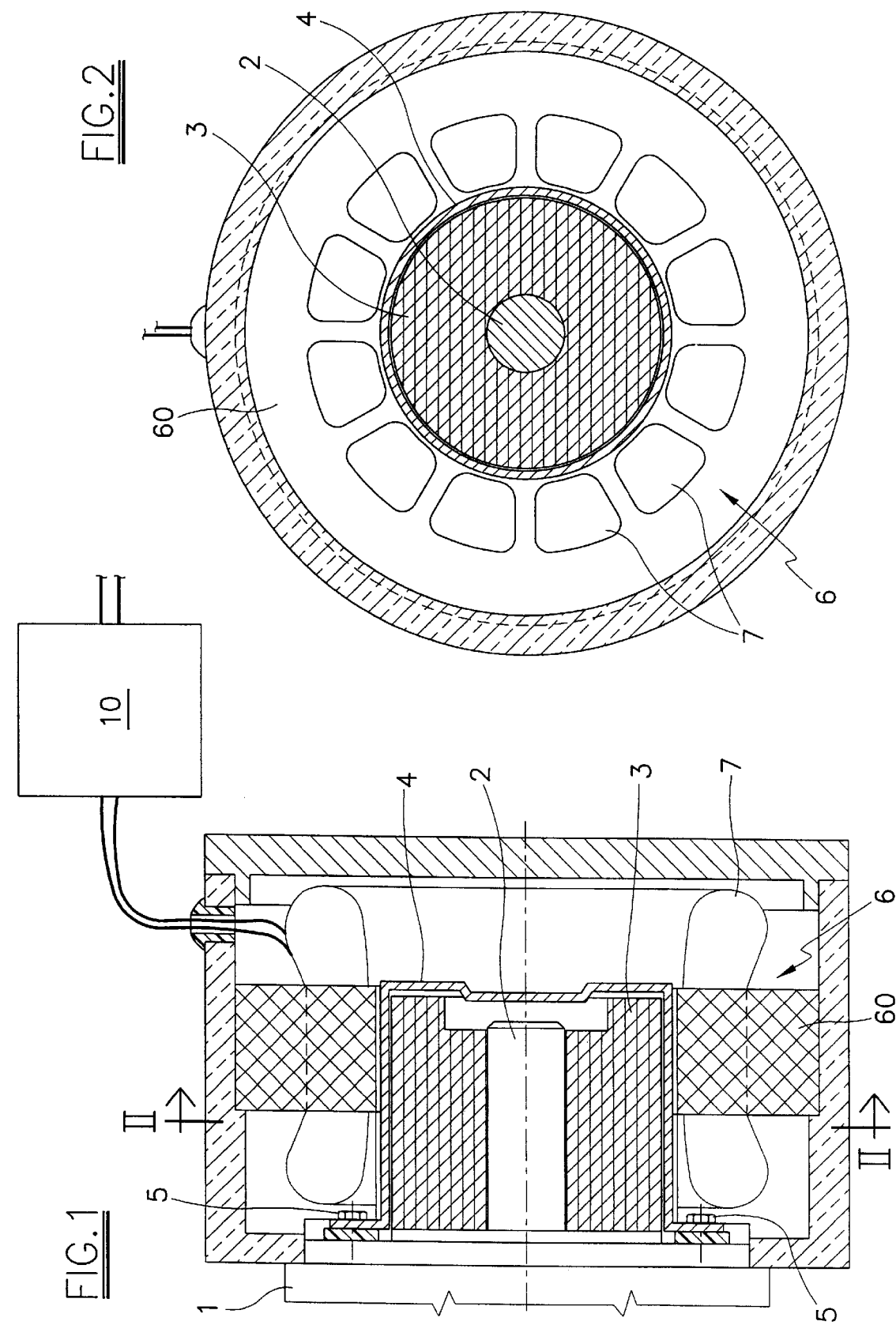

PUMP UNIT PARTICULARLY FOR MEDICAL AND FOOD USE

BACKGROUND OF THE INVENTION

Field of the Invention

The present invention relates to electric motors used for operating pumps, and particularly to those used for operating pumps intended for food or medical use.

The hygiene aspects of pumps for liquids for food use or for medicines in liquid form must be carefully controlled in that the pumped liquid must not come into contact with contaminants. To satisfy this requirement, in such pumps the impeller shaft is not mechanically connected to the motor shaft, but rather the shafts are connected together by electromagnetic coupling.

In particular, the free end of the impeller shaft emerging from the pump carries a pole wheel consisting of radial field electric magnets, the number of poles of which depend on the type of application.

The pole wheel is positioned inside a jacket in the shape of a cup of circular cross-section, and extends from the pump casing to form a chamber isolated from the outside. The jacket has an inner diameter of a few tenths of a millimeter greater than the outer diameter of the pole wheel, and is generally constructed of amagnetic stainless steel.

Outside the jacket there is an outer second pole wheel having a number of poles equal to the number of poles of the inner first pole wheel.

The second pole wheel is mechanically connected to an electric motor shaft in such a manner that upon rotating the motor shaft and hence the outer pole wheel, the inner pole wheel connected to the pump impeller is rotated by induction.

Although the described solution perfectly performs the function for which it is provided, it presents certain drawbacks.

A first drawback is derived from the overall size due to the in-line arrangement of the pump, the electromagnetic coupling and the electric drive motor.

A second drawback is derived from the fact that if the electric motor has a high static torque and good acceleration the inner pole wheel disengages from the outer pole wheel whereby the impeller does not move.

To solve the first drawback pumps have been proposed, one of which is fully described in U.S. Pat. No. 5,197,865, in which the outer pole wheel is replaced by the stator of a stepping motor having a number of stator poles different from the number of rotor poles.

The use of a stepping motor makes it necessary to use Hall probes or similar devices to exactly identify the position of the rotor relative to the stator field to prevent such current absorption as to cause excessive stator heating. In addition, the use of a stepping motor requires the use of a costly and complicated control system which makes the product economically less desirable. There is also the drawback of more complicated equipment construction due essentially to the power conductors for the Hall probes, for which two are required for each phase winding, to be added to the two power conductors for each phase.

SUMMARY OF THE INVENTION

Accordingly, the object of the present invention is to overcome the stated drawbacks within the framework of a rational, reliable and low-cost solution.

The present invention attains such object by providing a motor-pump unit in which the motor rotor is mechanically connected to the pump impeller while at the same time being physically isolated from the stator by a jacket made of amagnetic material.

Specifically, the stator, positioned outside the jacket of amagnetic material has a three-phase winding with a number of poles equal to the number of poles of the rotor winding.

To obtain a high static torque the present invention is powered by an electronic power circuit which generates a system of three-phase currents, the frequency of which gradually increases starting from zero, by following an appropriate acceleration ramp.

The electronic power circuit is controlled by a control circuit comprising a microprocessor which measures the counter-electromotive force arising in the stator, starting from a minimum value corresponding to about one quarter of the predetermined normal working r.p.m. In particular, the microprocessor is able to sense when the counter-electromotive force developing in the stator passes through zero, and hence identify the instantaneous position of the rotor. In this manner the motor current absorption can be controlled on the basis of the applied resistant torque. This enables current absorption to be limited by feeding the motor with only that current necessary for operating the load, thereby preventing overheating damage of the electrical circuits.

In a simplified embodiment, the motor of the present invention can be powered by a usual inverter. In this case however, the current absorbed by the motor is always equal to the maximum current required to provide the maximum torque.

The slope of the powering current diagram (ramp) for the motor evidently depends both on the resistant torque and on the moment of inertia of the rotating masses, such as the rotor and the impeller.

BRIEF DESCRIPTION OF THE DRAWINGS

The constructional and functional characteristics of the present invention will be apparent from the ensuing description of a preferred embodiment thereof given by way of non-limiting example and illustrated in the accompanying drawings, wherein FIG. 1 is a partial axial section through the pump of the present invention;

FIG. 2 is a section taken along line II—II of FIG. 1;

FIG. 1 shows a pump casing 1 from which there emerges an impeller shaft 2 carrying the pole wheel 3, which forms the rotor of the electric drive motor for the pump, as will be apparent hereinafter. In detail, the pole wheel 3 is fixed on the shaft 2 by suitable adhesives, but could instead be connected mechanically for example by a usual key.

Figure 3:
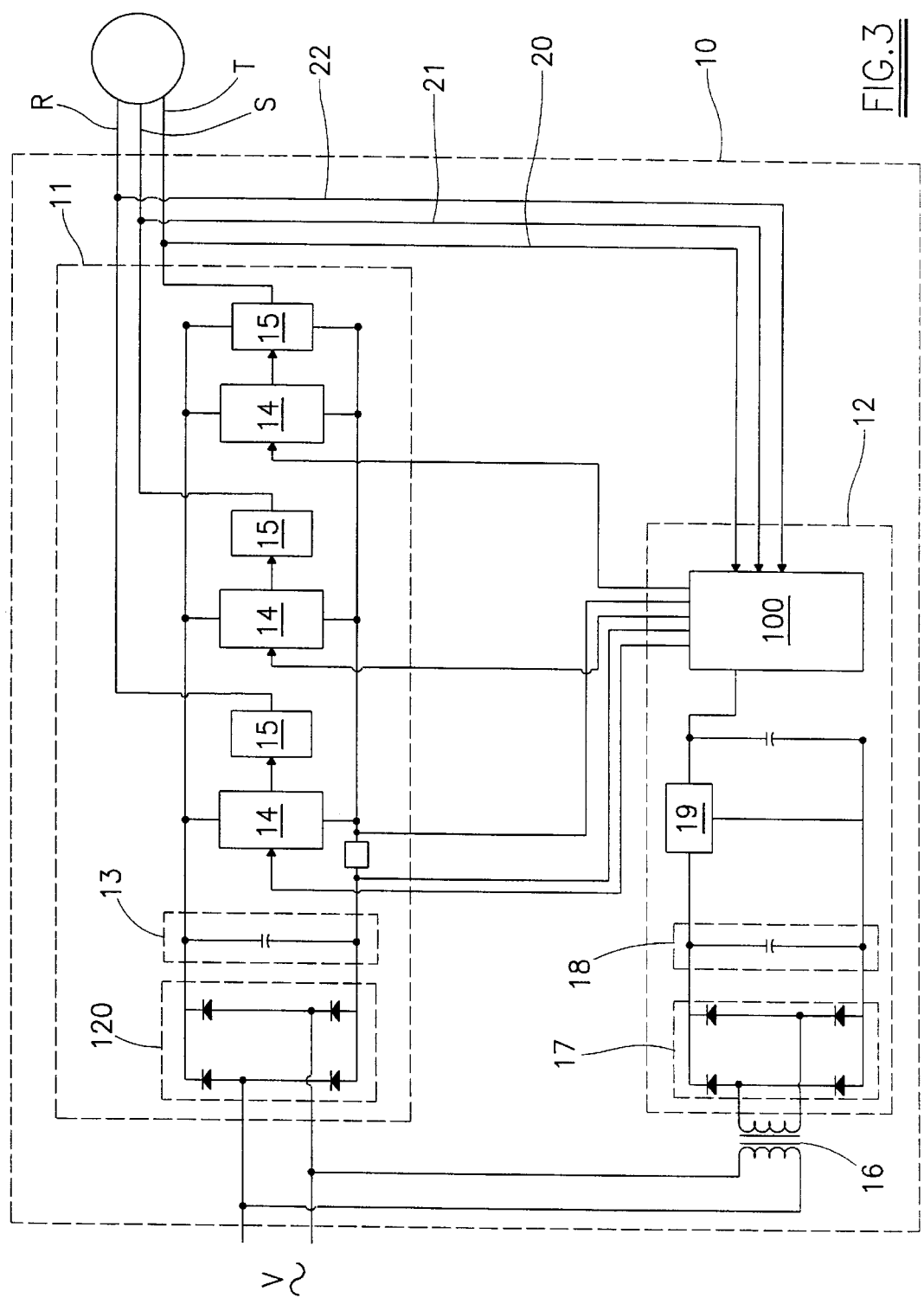
FIG. 3 is a schematic view of the control and power circuit used by the present invention.

External to the pole wheel there is provided the jacket 4, which is fixed to the pump casing 1 by screws 5 to form a sealed chamber.

The walls of the jacket 4 have a thickness of a few tenths of a millimeter and are constructed of amagnetic stainless steel.

The stator 6, consisting of the usual core 60 carrying the winding 7, is positioned outside the jacket 4. The stator has the same number of pairs of poles as the rotor, and is formed in such a manner that the average induction at the air gap due to the magnetizing current absorbed by the winding 7 is about equal to or greater than that of the pole wheel 3. If the pole wheel is made of ferrite the average induction at the air gap must be of the order of 0.3 Tesla, whereas if the pole wheel is made of rare earths the average induction at the air gap must be of the order of 0.8–1 Tesla.

Figure 4:
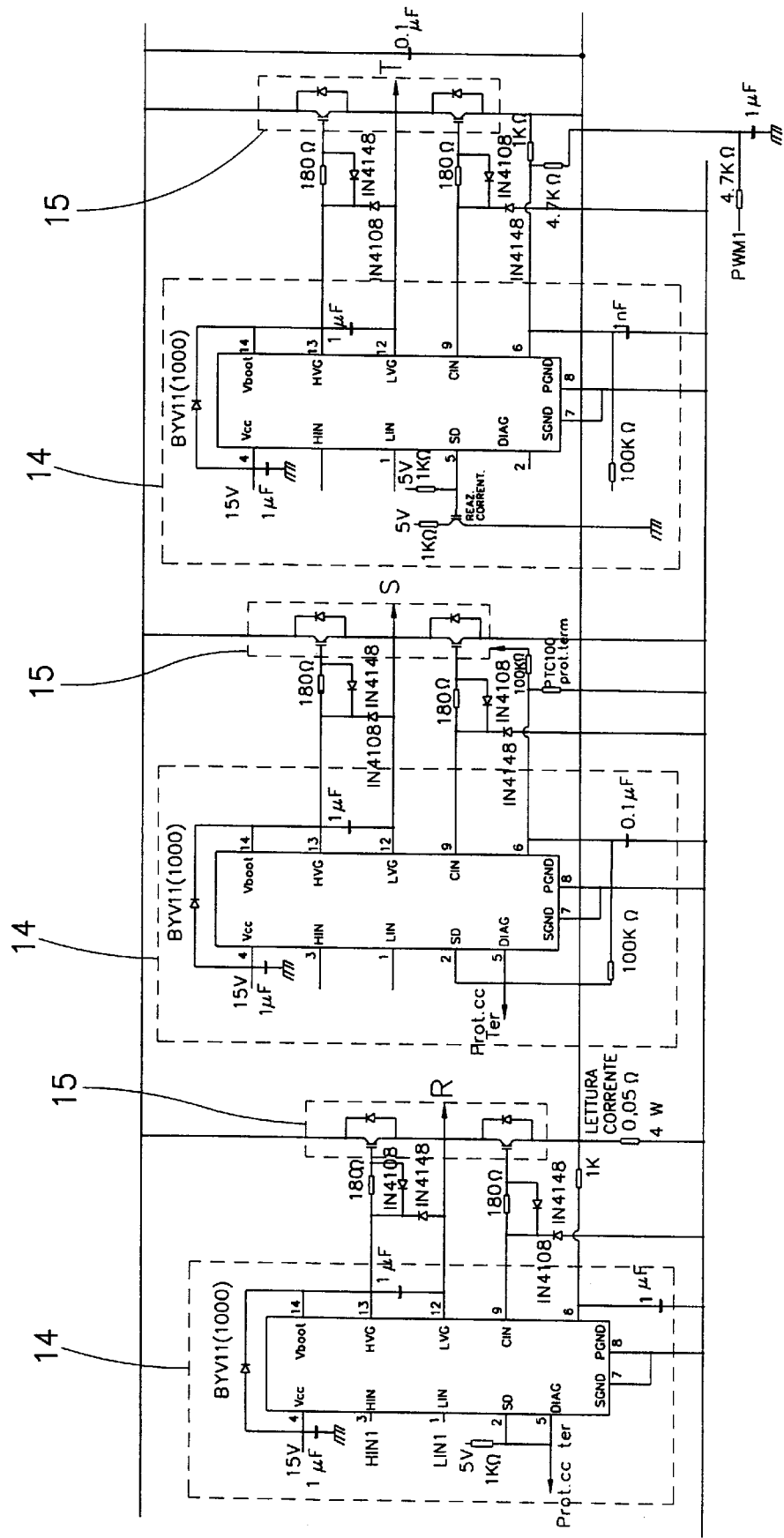
FIG. 4 is a detailed view of the driver used by the present invention, with its relative components.
Figure 5:
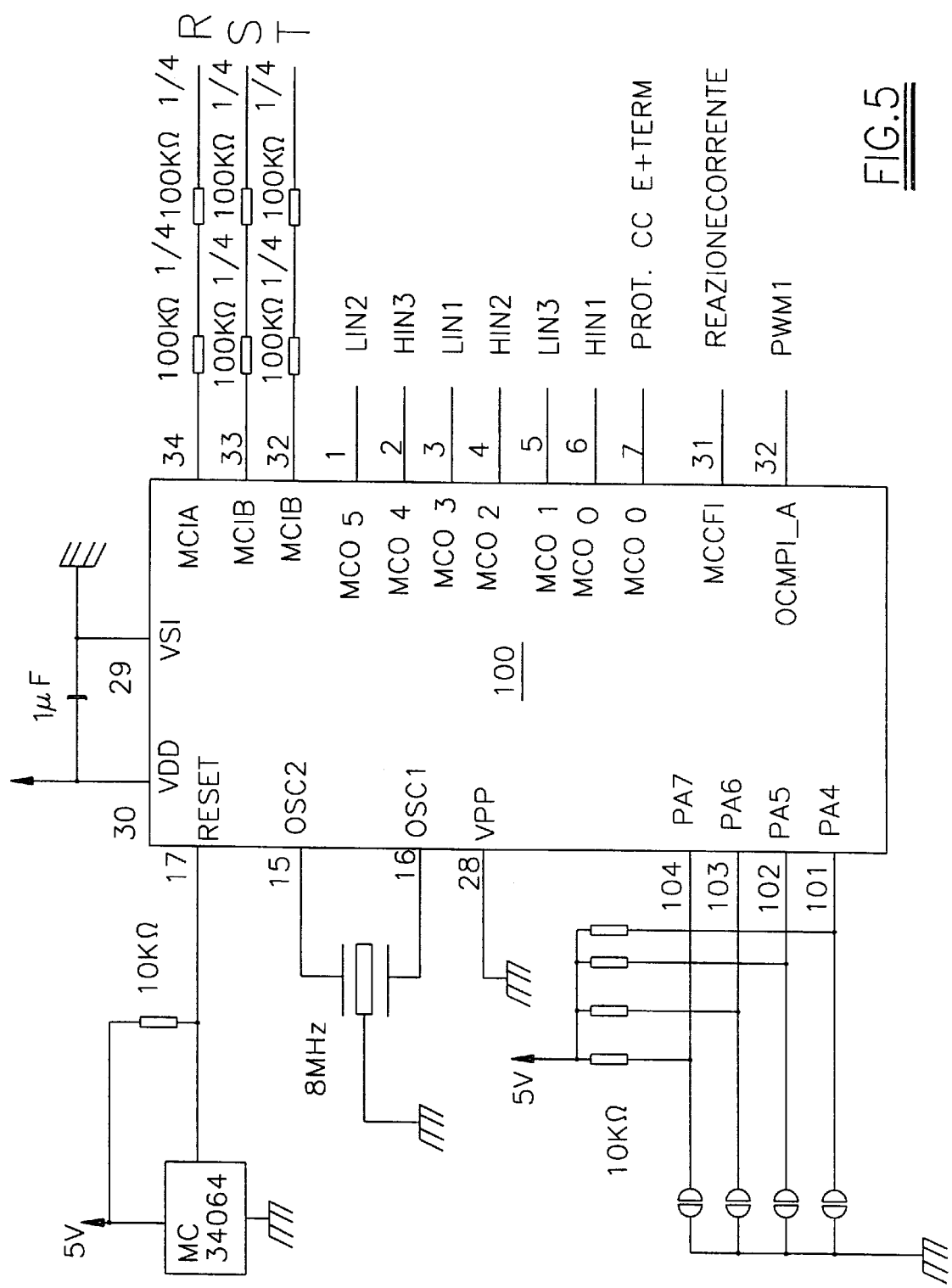
FIG. 5 is a schematic view of the processor used by the present invention.

In order for the rotor to remain coupled to the poles of the rotating magnetic field of the stator 6, this is powered by a power and control circuit 10 shown in FIGS. 3, 4 and 5.

FIG. 3 shows the circuit 10, comprising a power circuit 11 and a control circuit 12.

The power circuit 11 comprises a bridge rectifier 120 connected to a single-phase alternating current main supply, and downstream, to a filter capacitor 13. Downstream of the filter capacitor 13 there are provided means for feeding current to the stator, which in the illustrated example comprises three, usually identical drivers 14, of the type LM6386 manufactured by SGS THOMPSON.

One of the motor feed lines R, S, T is connected to each of the drivers 14, between each of the lines R, S, T and interposed between each of the drivers 14 is a usual IGBT bridge 15 (SGS THOMPSON).

FIG. 4 is a detailed view of the drivers 14 and IGBT bridges 15, with their relative known operating circuits supplied by the manufacturer of the components. The drivers 14 are provided with comparators giving protection against short circuits, protection against temperature increase, and delivered current limitation on the basis of the resistant torque.

The drivers 14 are controlled by a microprocessor 100, type ST72141 manufactured by SGS THOMPSON, powered by the same single-phase supply feeding the power circuit 11, via a 220/12 V transformer 16 of 2 VA power, the secondary of which is connected to a usual diode rectifier 17, downstream of which there is a filter capacitor 18 to which the power unit 19 of the microprocessor 100 is connected. The power unit 19 is of type 78L05 manufactured by SGS THOMPSON.

The microprocessor 100 is connected to the drivers 14 via the outputs LIN1, LIN2, LIN3 and the inputs HIN1, HIN2, HIN3, and to the lines R, S, T of the three-phase electric motor via the conductors 20, 21, 22, through which the microprocessor 100 is able to measure the counter-electromotive force arising in the three-phase stator of the electric motor, and hence to regulate the current absorbed by the electric motor on the basis of the predetermined motor speed. It should be noted that the counter-electromotive force depends on the rotor speed.

The microprocessor 100 is shown in detail in FIG. 5, from which it can be seen that four predetermined speeds can be preselected by the user via the terminals 101, 102, 103 and 104.

The invention operates in the following manner.

The current absorbed from the power line is equal to the maximum allowable current until the counter-electromotive force arising within the stator assumes a minimum value such as to be able to be measured by the microprocessor 100. Using the microprocessor type ST72141 manufactured by SGS THOMPSON, this minimum value is 40 V.

When the microprocessor is able to measure said counter-electromotive force, it is also able to identify its passages through zero and hence the instantaneous position of the rotor, which is always in phase with the counter-electromotive force. From that moment in which the microprocessor 100 measures the minimum counter-electromotive force, the current absorbed by the motor is no longer the maximum allowable current, but becomes a function of the resistant torque, in that the microprocessor controls the power to the drivers 14 on the basis of the instantaneous measured value of the counter-electromotive force, so as to operate each of the drivers 14 alternately for a predetermined period. In this manner, motor current control is achieved.

The present invention can instead, be powered simply by a usual inverter, not shown, such as type ALTIVAR 08 manufactured by TELEMECANIQUE. Although powering by means of an inverter allows the invention to operate correctly, it does not enable the current absorbed by the motor to be controlled. Thus, this solution is suitable only for those applications in which the cost must be maintained particularly low, and for which current control of the electric motor is not required.

It should be noted that in those applications in which the inverter is used, the slope of the acceleration ramp by which the motor is powered depends both on the moment of inertia of the rotor and on the resistant torque of the load.

What is claimed is:

1. A pump unit used for medical and food use which comprises:

a pump provided with a shaft emerging from a pump casing, a rotor having a number (n) of permanent magnet pairs of poles, said rotor being fixed directly onto the shaft of the pump;

a stator provided with an equal number (n) of pairs of poles;

a power and control circuit provided to power the stator, said power and control circuit commanded by the value of a counter electromotive force induced by the rotor; and a jacket of non-magnetic material positioned in an air gap between the rotor and the stator to isolate the rotor.

2. The pump unit as claimed in claim 1, wherein said power and control circuit comprises a microprocessor arranged to control the triggering of drivers for feeding current to the stator, and to regulate the driver conduction time on the basis of the instantaneous value of the counter-electromotive force.

3. The pump unit as claimed in claim 2, wherein the drivers are three identical drivers of the type LM6386.

4. The pump as claimed in claim 2, wherein the microprocessor is of the type ST72141.

5. The pump unit as claimed in claim 1, wherein the jacket is constructed of stainless steel.

6. The pump unit as claimed in claim 1, wherein the rotor poles are made of rare earth materials.

7. The pump unit as claimed in claim 1, wherein the rotor poles are constructed of ferrite.

8. The pump unit as claimed in claim 1, wherein the average induction at the air gap is of the order of 0.3 Tesla.

9. The pump unit as claimed in claim 1, wherein the average induction at the air gap is of the order of 0.8–1 Tesla.

* * * * *